(12) United States Patent
Watanabe et al.

(10) Patent No.: US 8,145,411 B2
(45) Date of Patent: Mar. 27, 2012

(54) IGNITION TIMING CONTROLLING APPARATUS AND IGNITION TIMING CONTROLLING METHOD FOR INTERNAL COMBUSTION ENGINE

(75) Inventors: Satoshi Watanabe, Okazaki (JP); Hiroto Tanaka, Toyota (JP); Rihito Kaneko, Nishikamo-gun (JP); Norihito Hanai, Toyota (JP); Kenji Senda, Okazaki (JP); Satoshi Masuda, Kariya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 618 days.

(21) Appl. No.: 12/395,877

(22) Filed: Mar. 2, 2009

(65) Prior Publication Data
US 2009/0217908 A1 Sep. 3, 2009

(30) Foreign Application Priority Data
Mar. 3, 2008 (JP) ................................. 2008-052135

(51) Int. Cl.
G06F 19/00 (2011.01)
F02P 5/152 (2006.01)
(52) U.S. Cl. .................. 701/111; 123/406.33; 701/115
(58) Field of Classification Search ............ 123/406.16, 123/406.21, 406.29, 406.33, 406.34, 406.37, 123/406.38; 701/101–103, 110, 111, 114, 701/115; 73/114.02, 114.07; 702/182, 183, 702/187
See application file for complete search history.

(56) References Cited

U.S. PATENT DOCUMENTS

| | | | | |
|---|---|---|---|---|
| 7,363,142 B2 * | 4/2008 | Kaneko et al. | ........... | 701/111 |
| 7,392,788 B2 * | 7/2008 | Kaneko et al. | ........... | 123/406.29 |
| 7,424,820 B2 * | 9/2008 | Iwade et al. | ........... | 123/406.38 |
| 7,643,932 B2 * | 1/2010 | Iwade et al. | ........... | 701/111 |
| 7,963,269 B2 * | 6/2011 | Kaneko et al. | ........... | 123/406.38 |
| 8,005,607 B2 * | 8/2011 | Yoshihara et al. | ........... | 701/111 |
| 2005/0257760 A1 | 11/2005 | Kato et al. | | |
| 2006/0129304 A1 | 6/2006 | Takemura et al. | | |
| 2007/0012090 A1 | 1/2007 | Yoshihara et al. | | |
| 2007/0215108 A1 | 9/2007 | Kaneko et al. | | |

FOREIGN PATENT DOCUMENTS

JP 64-017450 U 1/1989
(Continued)

OTHER PUBLICATIONS

R. Kaneko, H. Tanaka, S. Watanabe, N. Hanai, Y. Yamasako, K. Senda, and S. Masuda, "Ignition Timing Controlling Apparatus and Ignition Timing Controlling Method for Internal Combustion Engine," U.S. Appl. No. 12/263,216, filed Oct. 31, 2008.

(Continued)

*Primary Examiner* — Willis Wolfe, Jr.
(74) *Attorney, Agent, or Firm* — Gifford, Krass, Sprinkle, Anderson & Citkowski, P.C.

(57) ABSTRACT

An engine ECU executes a program including the steps of: calculating a knock magnitude N by dividing an integrated value lpkknk obtained by integrating the magnitude of vibration in the knock detection gate by BGL; controlling ignition timing according to a result of comparison between knock magnitude N and a determination value VJ; stopping updating of a standard deviation σ when it is determined that determination value VJ to be compared with knock magnitude N is to be changed; updating a median value VM by increasing an update amount of median value VM; and updating BGL according to median value VM and standard deviation σ.

27 Claims, 11 Drawing Sheets

FOREIGN PATENT DOCUMENTS

| | | |
|---|---|---|
| JP | 2002-188504 A | 7/2002 |
| JP | 2005-330911 A | 12/2005 |
| JP | 2006169996 | 6/2006 |
| JP | 2007009735 A * | 1/2007 |
| JP | 2007009814 | 1/2007 |
| JP | 2007255195 | 10/2007 |
| JP | 2008008177 A * | 1/2008 |

OTHER PUBLICATIONS

Office action mailed Sep. 20, 2011 from corresponding Japanese Patent Appln No. 2008-052135.

* cited by examiner

| ENGINE SPEED NE | NE<NE1 | NE1 ≤ NE<NE2 | NE2 ≤ NE |
|---|---|---|---|
| LENGTH OF KNOCK DETECTION GATE | 75° CA | 75° CA | 60° CA |
| KNOCK DETECTION GATE | 5-80° CA | 10-85° CA | 15-75° CA |

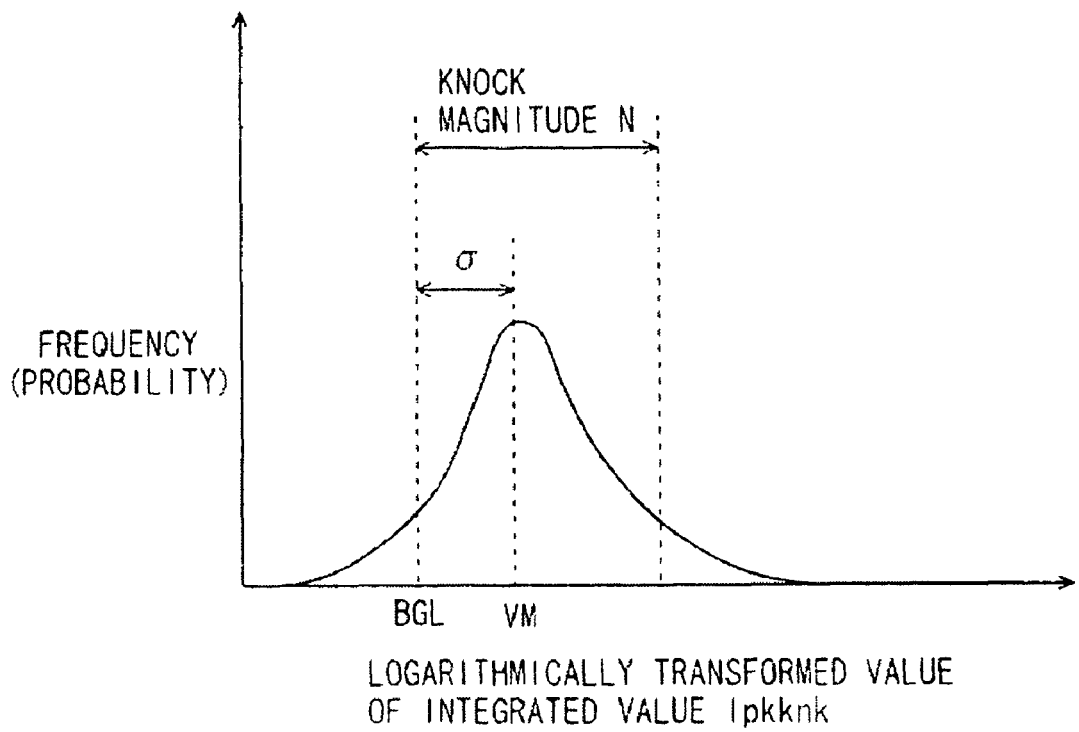

IGNITION TIMING CONTROLLING APPARATUS AND IGNITION TIMING CONTROLLING METHOD FOR INTERNAL COMBUSTION ENGINE

This nonprovisional application is based on Japanese Patent Application No. 2008-052135 filed on Mar. 3, 2008 with the Japan Patent Office, the entire contents of which are hereby incorporated by reference.

BACKGROUND OF THE INVENTION

1. Field of the Invention

The present invention relates to an ignition timing control apparatus and an ignition timing control method for an internal combustion engine, and particularly to a technique of controlling ignition timing according to a result of comparison between a value calculated from a magnitude (intensity) of vibration of an internal combustion engine and a determination value.

2. Description of the Background Art

Conventionally, various methods of determining whether knocking (knock) is present or absent have been proposed. For example, there is a technique of determining whether a magnitude of vibration detected in an internal combustion engine is larger than a knock determination value or not, and thereby determining whether knocking has occurred or not. However, the magnitude of vibration detected in the internal combustion engine may change due to secular changes in the internal combustion engine and a knock sensor. Also, the magnitude of vibration detected in a certain internal combustion engine may be different from those of other internal combustion engines. For precisely determining the presence/absence of the knocking, therefore, it is desired to correct the knock determination value according to the magnitude that is actually detected in the internal combustion engine.

Japanese Patent Laying-Open No. 2007-255195 has disclosed an ignition timing control apparatus for an internal combustion engine, including: a detecting unit for detecting for a plurality of times a magnitude of vibration occurring in an internal combustion engine; a first calculating unit for calculating a knock magnitude related to a magnitude of vibration due to knocking, in accordance with each magnitude detected by the detecting unit; a controlling unit for controlling ignition timing of the internal combustion engine, based on a result of comparison between the knock magnitude and a first determination value; a second calculating unit for calculating a median value and a standard deviation of the magnitudes detected by the detecting unit; and a correcting unit for correcting the first determination value so that a degree of ignition timing being retarded by the controlling unit becomes greater when a second determination value calculated by adding a product of the standard deviation and a predetermined coefficient to the median value is greater than the first determination value. The knock magnitude is calculated by dividing the magnitude of vibration by a BGL (Back Ground Level). The BGL is calculated by subtracting the product of the standard deviation and the coefficient from the median value. The first determination value is stored as a map for each of regions divided according to an operation state using an engine speed and the quantity of intake air (load) as parameters.

According to the ignition timing control apparatus disclosed in the above publication, the magnitude of the vibration occurring in the internal combustion engine is detected multiple times. The knock magnitude related to the magnitude of the vibration that is caused by knocking is calculated according to each magnitude thus detected. The ignition timing of the internal combustion engine is controlled based on a result of the comparison between this knock magnitude and the predetermined determination value. For example, when the knock magnitude is larger than the determination value, the ignition timing is retarded. When the knock magnitude is smaller than the determination value, the ignition timing is advanced. When the second determination value calculated by adding the product of the standard deviation and the predetermined coefficient to the median value is larger than the first determination value, the first determination value is corrected and increased by an extent to which the control unit retards the ignition timing. Thereby, in a state where the knocking occurs frequently, it is possible to suppress excessive increase of the determination value to be compared with the magnitude of vibration with respect to the vibration occurring in the internal combustion engine. Therefore, the ignition timing can be retarded easily. Consequently, occurrence of the knocking can be suppressed.

In the ignition timing control apparatus disclosed in Japanese Patent Laying-Open No. 2007-255195, the determination value to be compared with the knock magnitude may be changed stepwise according to the changing operation state. Therefore, for example, the determination value may be decreased stepwise. On the other hand, the BGL used for calculating the knock magnitude follows behind the actual magnitude of vibration of the internal combustion engine. If the BGL follows behind the actual magnitude of vibration of the internal combustion engine, the calculated knock magnitude may be too large or too small. In this case, even though knocking does not occur, the ignition timing may be retarded erroneously, or even though knocking occurs, the ignition timing may be advanced erroneously. The accuracy of ignition timing thus may be deteriorated.

SUMMARY OF THE INVENTION

An object of the present invention is to control ignition timing accurately.

An ignition timing control apparatus for an internal combustion engine in accordance with an aspect includes a knock sensor detecting a magnitude of vibration of the internal combustion engine in a plurality of ignition cycles and a control unit. The control unit calculates a first value representing a median value of the magnitude by updating the first value according to the magnitude, calculates a second value representing a standard deviation of the magnitude by updating the second value according to the magnitude, calculates a third value based on the first and second values, calculates a fourth value based on the magnitude and the third value, controls ignition timing of the internal combustion engine according to a result of comparison between the fourth value and a determination value selected from among a predetermined plurality of determination values, determines whether the determination value to be compared with the fourth value is to be changed or not, updates the first value so that the first value changes faster, when it is determined that the determination value to be compared with the fourth value is to be changed, and stops updating of the second value when it is determined that the determination value to be compared with the fourth value is to be changed.

According to this structure, the magnitude of vibration of the internal combustion engine is detected in the plurality of ignition cycles. The first value representing the median value of the detected magnitude and the second value representing the standard deviation are calculated. The first and second values are calculated by updating the first and second values according to the magnitude. The third value based on these first and second values is calculated. Thereby, the BGL providing the reference of the magnitude of vibration can be obtained. The fourth value based on the magnitude and the third value is calculated. For example, the fourth value is calculated by dividing the magnitude by the third value. Thereby, the fourth value representing the relative magnitude between the detected magnitude and the reference of the vibration magnitude can be obtained. The ignition timing of the internal combustion engine is controlled according to a result of the comparison between the fourth value and the determination value. For example, when the fourth value is larger than the determination value, the probability that the knocking occurred is high. Therefore, the ignition timing is retarded. On the other hand, when the fourth value is smaller than the determination value, the ignition timing is advanced. The determination value to be compared with the fourth value is selected from among a predetermined plurality of determination values. When it is determined that the determination value to be compared with the fourth value is to be changed, the first value representing the median value is updated so as to change faster, and the updating of the second value representing the standard deviation is stopped. This allows the first value representing the median value to quickly follow the magnitude actually attained in the internal combustion engine. In addition, it is possible to prevent a change of the second value representing the standard deviation which may suddenly increase with a sudden change of the detected magnitude. This can reduce the third value's delay in following the vibration actually occurring in the internal combustion engine. Accordingly, the fourth value precisely corresponding to the vibration that actually occurred in the internal combustion engine can be obtained. Consequently, the frequency of erroneously advancing or retarding the ignition timing can be reduced, and the ignition timing can be controlled precisely.

Preferably, the control unit updates the first value so that the first value changes faster by a predetermined number of times, when it is determined that the determination value to be compared with the fourth value is to be changed, and the control unit stops updating of the second value by the predetermined number of times, when it is determined that the determination value to be compared with the fourth value is to be changed.

According to this structure, the first value representing the median value is updated so as to change faster by a predetermined number of times, and the updating of the second value representing the standard deviation is stopped by a predetermined number of times. This can restrict the period of time during which the first value is updated faster and the updating of the second value is stopped. Therefore, the updating of the first value can be made faster and the updating of the second value can be stopped by a time required to obtain the fourth value precisely corresponding to the vibration actually occurring in the internal combustion engine.

Further preferably, the internal combustion engine is provided with a mechanism changing a lift amount of at least one of an intake valve and an exhaust valve. A plurality of the determination values are determined according to the lift amount of at least one of the intake valve and the exhaust valve.

According to this structure, since the magnitude of vibration occurring in the internal combustion engine changes according to the lift amount of at least one of the intake valve and the exhaust valve, a plurality of determination values are determined according to the lift amount of at least one of the intake valve and the exhaust valve. Therefore, it is possible to precisely determine whether knocking occurred or not and to precisely determine the ignition timing.

Further preferably, a plurality of the determination values are determined according to a load and a number of revolutions of an output shaft of the internal combustion engine.

According to this structure, since the magnitude of vibration occurring in the internal combustion engine changes according to the load and the number of revolutions of the output shaft of the internal combustion engine, a plurality of determination values are determined according to the load and the number of revolutions of the output shaft of the internal combustion engine. Therefore, it is possible to precisely determine whether knocking occurred or not and to precisely determine the ignition timing.

Further preferably, the knock sensor detects the magnitude of vibration of the internal combustion engine in a predetermined crank angle section. A plurality of lengths of the crank angle section are determined according to a number of revolutions of an output shaft of the internal combustion engine. A plurality of the determination values are determined according to the length of the crank angle section.

According to this structure, the magnitude of vibration of the internal combustion engine is detected in a predetermined crank angle section. A plurality of lengths of the crank angle section are determined according to the number of revolutions of the output shaft of the internal combustion engine. Since the magnitude of vibration occurring in the internal combustion engine may change according to the length of the crank angle section in which the magnitude is detected, a plurality of determination values are determined according to the length of the crank angle section. Therefore, it is possible to precisely determine whether knocking occurred or not and to precisely determine the ignition timing.

Further preferably, the knock sensor detects the magnitude of vibration of the internal combustion engine in a predetermined crank angle section. A plurality of the crank angle sections are determined according to a number of revolutions of an output shaft of the internal combustion engine. A plurality of the determination values are determined according to the crank angle section.

According to this structure, the magnitude of vibration of the internal combustion engine is detected in a predetermined crank angle section. A plurality of crank angle sections are determined according to the number of revolutions of the output shaft of the internal combustion engine. Since the magnitude of vibration occurring in the internal combustion engine may change according to the crank angle section in which the magnitude is detected, a plurality of determination values are determined according to the crank angle section. Therefore, it is possible to precisely determine whether knocking occurred or not and to precisely determine the ignition timing.

Further preferably, when it is determined that the determination value to be compared with the fourth value is to be changed, the control unit changes the determination value to be compared with the fourth value at timing corresponding to a relative magnitude between the determination value before change and the determination value after change.

According to this structure, when it is determined that the determination value to be compared with the fourth value is to be changed, the determination value to be compared with the fourth value is changed at the timing corresponding to the relative magnitude between the determination value before change and the determination value after change. For example, in the case where the fourth value to be compared with the determination value may be calculated to be temporarily increased in relation to the actual magnitude of vibration of the internal combustion engine, it is possible to allow a large determination value to be used longer. Thus, the frequency of erroneously retarding the ignition timing can be reduced.

Further preferably, the control unit retards the ignition timing when the fourth value is larger than the determination value. The control unit changes the determination value to be compared with the fourth value after a predetermined time has passed since it was determined that the determination value to be compared with the fourth value was to be changed, when the determination value before change is larger than the determination value after change. The control unit changes the determination value to be compared with the fourth value before the predetermined time has passed since it was determined that the determination value to be compared with the fourth value was to be changed, when the determination value before change is smaller than the determination value after change.

According to this structure, when the determination value before change is larger than the determination value after change, the timing at which the determination value is changed is delayed. When the determination value before change is smaller than the determination value after change, the determination value is changed quickly. Accordingly, in the case where the fourth value to be compared with the determination value may be calculated to be temporarily increased in relation to the actual magnitude of vibration of the internal combustion engine, it is possible to allow a large determination value to be used longer. Thus, the frequency of erroneously retarding the ignition timing can be reduced.

An ignition timing control apparatus for an internal combustion engine in accordance with another aspect includes a knock sensor detecting a magnitude of vibration of the internal combustion engine in a plurality of ignition cycles and a control unit. The control unit calculates a first value representing a median value of the magnitude by updating the first value according to the magnitude, calculates a second value representing a standard deviation of the magnitude by updating the second value according to the magnitude, calculates a third value based on the first and second values, calculates a fourth value based on the magnitude and the third value, controls ignition timing of the internal combustion engine according to a result of comparison between the fourth value and a determination value selected from among a predetermined plurality of determination values, determines whether the determination value to be compared with the fourth value is to be changed or not, and updates the first value so that the first value changes faster, when it is determined that the determination value to be compared with the fourth value is to be changed.

According to this structure, the magnitude of vibration of the internal combustion engine is detected in the plurality of ignition cycles. The first value representing the median value of the detected magnitude and the second value representing the standard deviation are calculated. The first and second values are calculated by updating the first and second values according to the magnitude. The third value based on these first and second values is calculated. Thereby, the BGL providing the reference of the magnitude of vibration can be obtained. The fourth value based on the magnitude and the third value is calculated. For example, the fourth value is calculated by dividing the magnitude by the third value. Thereby, the fourth value representing the relative magnitude between the detected magnitude and the reference of the vibration magnitude can be obtained. The ignition timing of the internal combustion engine is controlled according to a result of the comparison between the fourth value and the determination value. For example, when the fourth value is larger than the determination value, the probability that the knocking occurred is high. Therefore, the ignition timing is retarded. On the other hand, when the fourth value is smaller than the determination value, the ignition timing is advanced. The determination value to be compared with the fourth value is selected from among a predetermined plurality of determination values. When it is determined that the determination value to be compared with the fourth value is to be changed, the first value representing the median value is updated so as to change faster. This allows the first value representing the median value to quickly follow the magnitude actually attained in the internal combustion engine. This can reduce the third value's delay in following the vibration actually occurring in the internal combustion engine. Accordingly, the fourth value precisely corresponding to the vibration actually occurring in the internal combustion engine can be obtained. Consequently, the frequency of erroneously advancing or retarding the ignition timing can be reduced, and the ignition timing can be controlled precisely.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 shows a knock magnitude N.
FIG. 11 shows a region defining a determination value VJ.

DESCRIPTION OF THE PREFERRED EMBODIMENTS

Figures 1, 2:
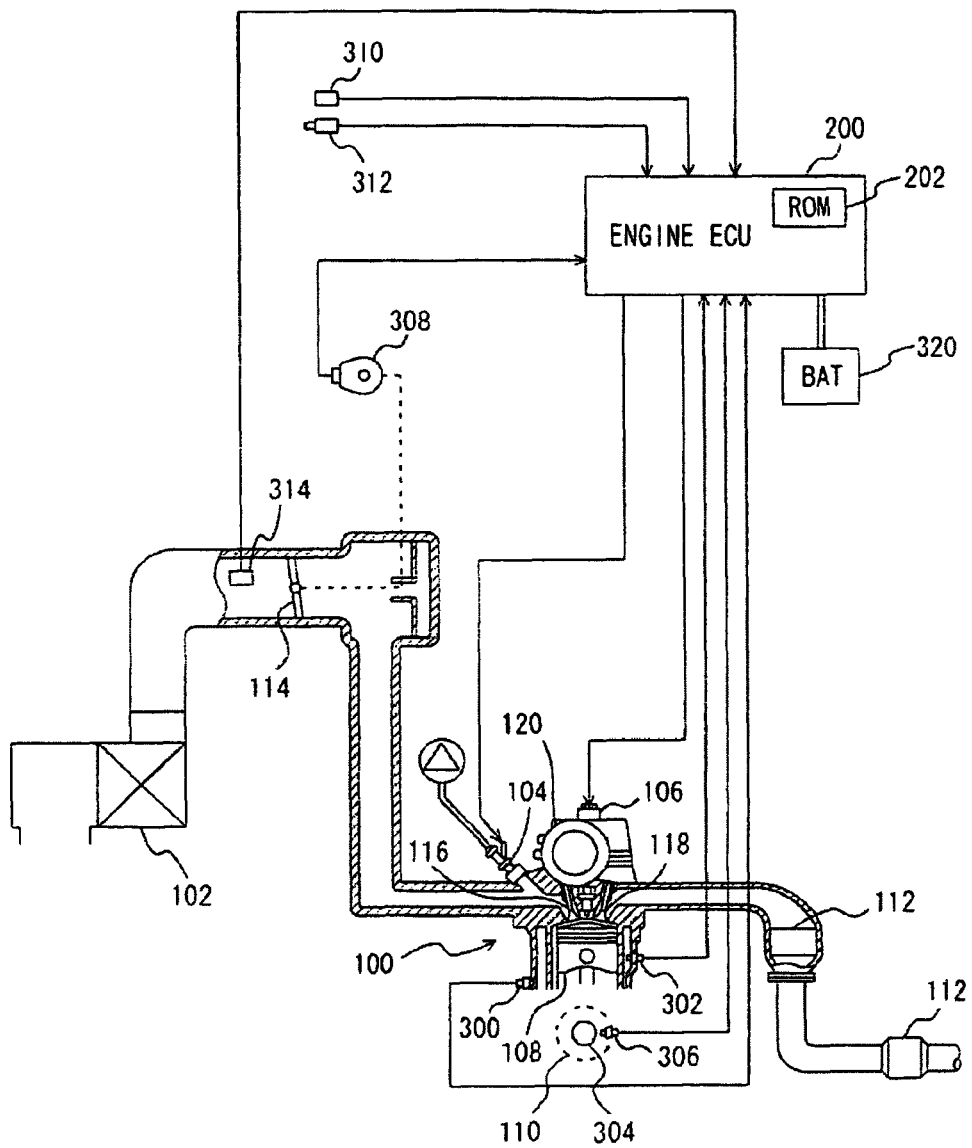
FIG. 1 schematically shows a structure of an engine.
FIG. 2 shows a map determining a knock detection gate.

An embodiment of the present invention will be described below with reference to the drawings. In the following description, the same parts are provided with the same reference numerals. They have the same names and functions. Therefore, detailed description of the same parts is not repeated.

With reference to FIG. 1, an engine 100 of a vehicle mounted with an ignition timing control apparatus according to the embodiment of the present invention will be described.

Engine 100 is provided with a plurality of cylinders. The ignition timing control apparatus according to this embodiment is accomplished by a program executed by an engine ECU (Electronic Control Unit) 200, for example. The program executed by engine ECU 200 may be recorded on such a recording medium as CD (Compact Disc) or DVD (Digital Versatile Disc) to be distributed on the market.

Engine 100 is an internal combustion engine in which an air-fuel mixture of air suctioned from an air cleaner 102 and fuel injected from an injector 104 is ignited by a spark plug 106 and burnt in a combustion chamber.

The ignition timing is set according to an operation state of engine 100. In the following description, the ignition timing that is set according to the operation state of engine 100 may also be referred to as basic ignition timing. For example, when knocking occurs, the ignition timing is retarded from the basic ignition timing.

When the air-fuel mixture is burnt, a piston 108 is pushed down by the combustion pressure and a crankshaft 110 is rotated. The air-fuel mixture after combustion (exhaust gas) is cleaned by three-way catalysts 112 and thereafter exhausted to the outside of the vehicle. The quantity of air suctioned into engine 100 is regulated by a throttle value 114. When an intake value 116 opens, the air-fuel mixture is take into the combustion chamber. When an exhaust value 118 opens, the exhaust gas is discharged from the combustion chamber.

The lift amount of intake valve 116 is changed by a VVL (Variable Valve Lift) mechanism 120. The lift amount is determined according to the map having a load (load factor), for example. When the temperature of coolant of engine 100 is lower than a threshold value, for example, a predetermined value is set as a lift amount. The method of determining the lift amount is not limited to this. Any other well-known technique may be employed.

In addition to the lift amount, the open/close timing (phase) of intake valve 116 may be changed. The lift amount or the open/close timing of exhaust valve 118, besides intake valve 116, may be changed.

Engine 100 is controlled by engine ECU 200. Connected to engine ECU 200 are a knock sensor 300, a water temperature sensor 302, a crank position sensor 306 provided to face a timing rotor 304, a throttle opening position sensor 308, a vehicle speed sensor 310, an ignition switch 312, and an air flow meter 314.

Knock sensor 300 is provided to a cylinder block of engine 100. Knock sensor 300 has a piezoelectric element. Knock sensor 300 generates a voltage in response to vibration of engine 100. The magnitude of the voltage corresponds to the magnitude of vibration. Knock sensor 300 sends a signal representing the voltage to engine ECU 200. Water temperature sensor 302 detects the temperature of a coolant in a water jacket of engine 100 and sends a signal representing the detection result to engine ECU 200.

Timing rotor 304 is provided to crankshaft 110 and rotates together with crankshaft 110. On the outer periphery of timing rotor 304, a plurality of protrusions are provided at predetermined intervals. Crank position sensor 306 is provided to face the protrusions of timing rotor 304. When timing rotor 304 rotates, an air gap between the protrusion of timing rotor 304 and crank position sensor 306 changes and, as a result, the magnetic flux passing through a coil portion of crank position sensor 306 increases/decreases to generate an electromotive force in the coil portion. Crank position sensor 306 sends a signal representing the electromotive force to engine ECU 200. Engine ECU 200 detects the crank angle and the number of revolutions of crankshaft 110 (engine speed NE) based on the signal sent from crank position sensor 306.

Throttle opening position sensor 308 detects a throttle opening position and sends a signal representing the detection result to engine ECU 200. Vehicle speed sensor 310 detects the number of revolutions of a wheel (not shown) and sends a signal representing the detection result to engine ECU 200. Engine ECU 200 calculates the vehicle speed based on the number of revolutions of the wheel. Ignition switch 312 is turned on by a driver when engine 100 is to be started. Air flow meter 314 detects the quantity of intake air into engine 100 and sends a signal representing the detection result to engine ECU 200. The load of engine 100 is calculated based on the quantity of intake air into engine 100. The method of calculating the load uses a well-known general technique and the detailed description thereof is therefore not repeated here.

Engine ECU 200 is operated by electric power supplied from an auxiliary battery 320 that is a power supply. Engine ECU 200 performs operation processes based on signals sent from respective sensors and ignition switch 312 as well as a map and a program stored in a ROM (Read-Only Memory) 202, and controls relevant devices so as to allow engine 100 to operate in a desired state.

In the present embodiment, engine ECU 200 detects a waveform of vibration (hereafter referred to as "vibration waveform") of engine 100 in a predetermined knock detection gate (a section from a predetermined first crank angle to a predetermined second crank angle), based on the signal sent from knock sensor 300 and the crank angle, and determines whether or not knocking has occurred in engine 100, based on the detected vibration waveform.

As shown in FIG. 2, the knock detection gate is determined according to engine speed NE. In the present embodiment, when engine speed NE is equal to or lower than NET, the knock detection gate is ATDC (After Top Dead of Center) 5°CA (Crank Angle)-ATDC 80°CA, and the length of the knock detection gate is 75°CA.

When engine speed NE is equal to or higher than NE1 and less than NE2, the knock detection gate is ATDC10°CA-ATDC 85°CA, and the length of the knock detection gate is 75°CA.

When engine speed NE is equal to or higher than NE2, the knock detection gate is ATDC15°CA-ATDC75°CA, and the length of the knock detection gate is 60°CA. The knock detection gate shown in FIG. 2 is shown by way of example and is not limited to this.

Figure 3:
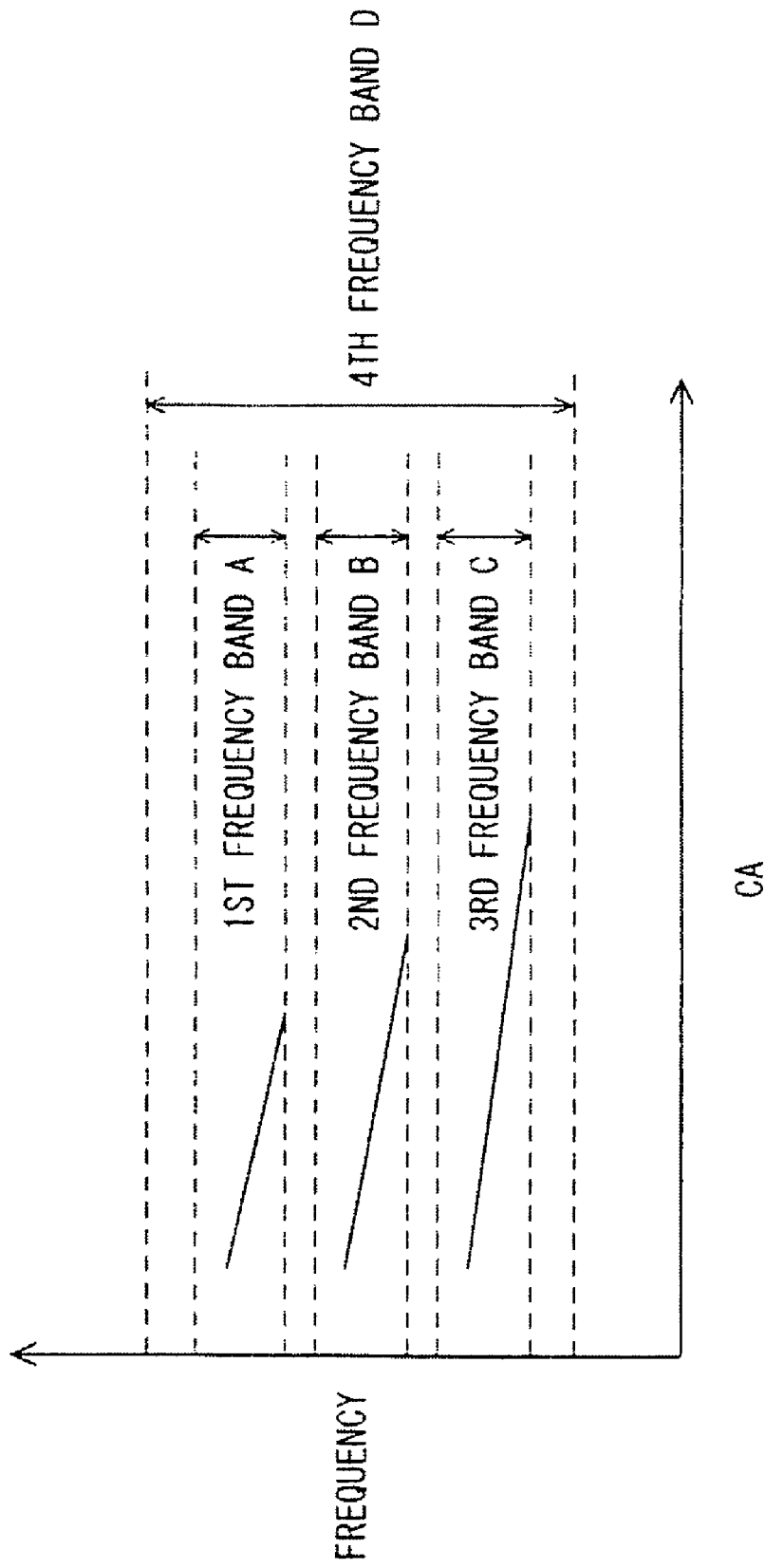
FIG. 3 shows frequency bands of vibrations occurring in the engine at the time of knocking.

When knocking occurs, vibration at a frequency included in frequency bands A-C is generated in engine 100 as shown in FIG. 3. Accordingly, in the present embodiment, vibration is detected in a broader frequency band D including the first to third frequency bands A to C.

Figure 4:
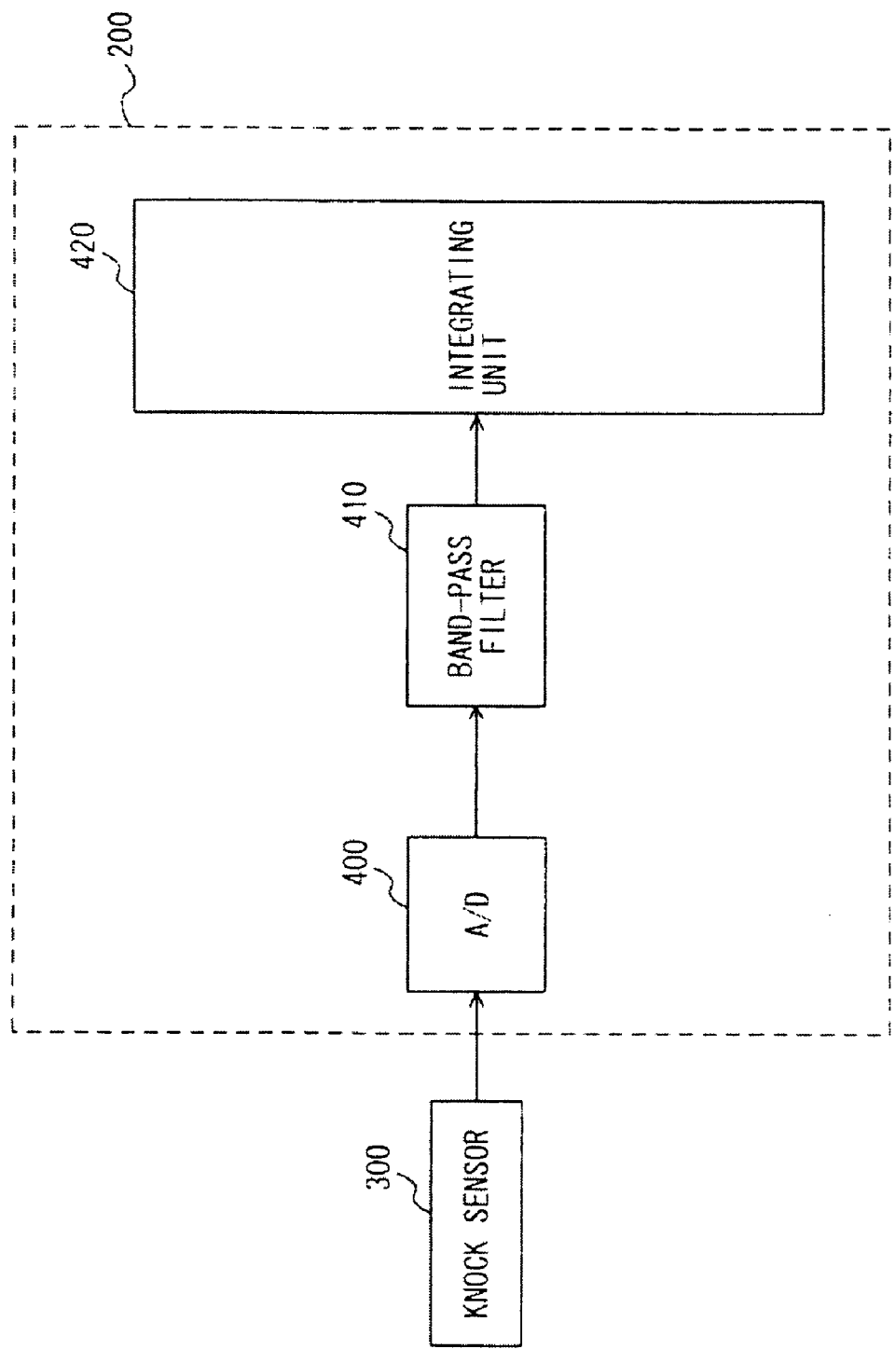
FIG. 4 is a control block diagram showing an engine ECU.

As shown in FIG. 4, engine ECU 200 includes an A/D (analog/digital) converter 400, a band-pass filter 410 and an integrating unit 420.

Analog/digital converter 400 converts analog signals into digital signals. Band-pass filter 410 passes only the signal in frequency band D out of the signals transmitted from knock sensor 300. In other words, band-pass filter 410 extracts only the vibration in frequency band D out of the vibrations detected by knock sensor 300.

Figure 5:
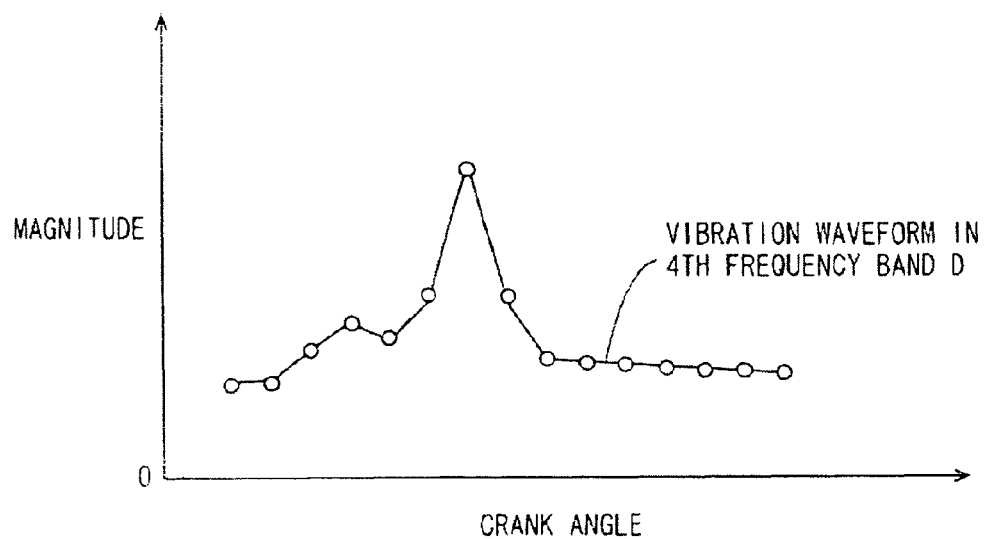
FIG. 5 shows a vibration waveform of the engine.

Integrating unit 420 calculates an integrated value by integrating the signal selected by band-pass filter 410, namely integrating the magnitudes of vibration for every crank angle range of 5°CA (hereinafter also referred to as 5°CA integrated value). Thereby, the vibration waveform of frequency band D is detected as shown in FIG. 5.

Figure 6:
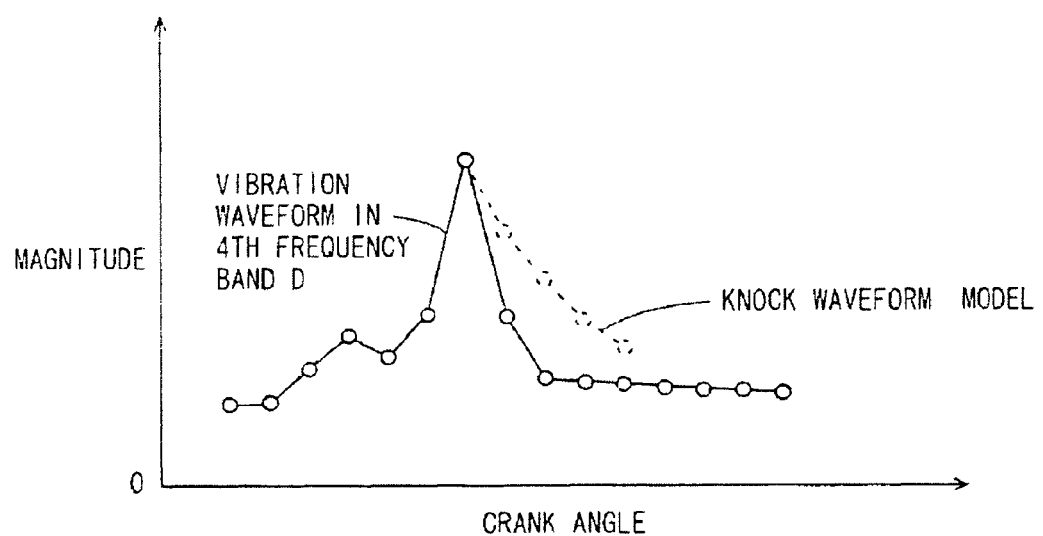
FIG. 6 shows the vibration waveform and a knock waveform model for comparison.

The detected vibration waveform is used for calculating a correlation coefficient K that represents the degree of similarity of the vibration waveform to the knock waveform model (i.e., represents a difference in form between the vibration waveform and the knock waveform model). Correlation coefficient K is calculated by comparing the knock waveform model with the vibration waveform detected in a range of a crank angle higher than a crank angle at which the magnitude reaches a peak, i.e., a crank angle that exhibits a larger magnitude than those at neighboring crank angles and is the largest among such larger magnitudes, as shown in FIG. 6.

The knock waveform model is defined as a reference vibration waveform of engine 100 for the case where the knocking occurs. In the present embodiment, the magnitude of the knock waveform model is set every time the comparison with the vibration waveform is performed. More specifically, the magnitude of the knock waveform mode is set such that the maximum value thereof may be equal to the magnitude (a peak value of the magnitude) larger than the neighbor magnitudes on the vibration waveform.

The magnitudes other than the maximum magnitude are set according to engine speed NE and the load of engine 100. More specifically, the damping rate of the magnitude at the neighboring crank angle is set according to a map using engine speed NE and the load of engine 100 as parameters.

Figure 7:
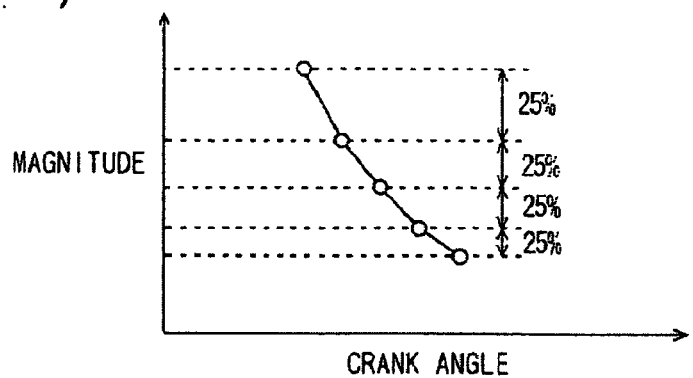
FIG. 7 shows a knock waveform model.

For example, when the damping rate is 25% and the magnitudes in a range of crank angle of 20° are set, the magnitude decreases 25% per unit crank angle as shown in FIG. 7. Here, the method of setting the magnitude on the knock waveform model is not limited to the above-described one.

The absolute value of the difference (amount of deviation) between the magnitude on the vibration waveform and the magnitude on the knock waveform model is calculated for every crank angle (every 5°CA) to thereby calculate correlation coefficient K. The absolute value of the difference between the magnitude on the vibration waveform and the magnitude on the knock waveform model for every crank angle other than 5°CA may be calculated instead.

Figure 8:
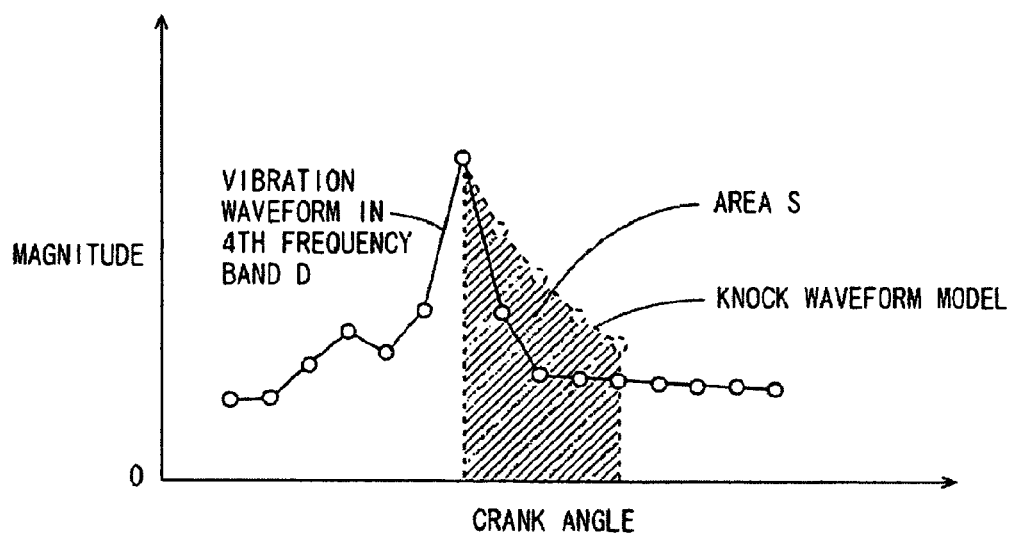
FIG. 8 shows an area S of the knock waveform model.

It is supposed here that the absolute value of the difference between the magnitude on the vibration waveform and the magnitude on the knock waveform model for each crank angle is $\Delta S$ (I) (I is a natural number). As shown by the oblique lines in FIG. 8, it is supposed that the sum of the magnitudes of vibrations on the knock waveform model, namely the area of the knock waveform model, is S. Correlation coefficient K is calculated using equation (1) below:

$$K=(S-\Sigma \Delta S(I))/S \quad (1)$$

where $\Sigma \Delta S$ (I) is the total of $\Delta S$ (I). The method of calculating correlation coefficient K is not limited to the above-described one.

Figure 9:
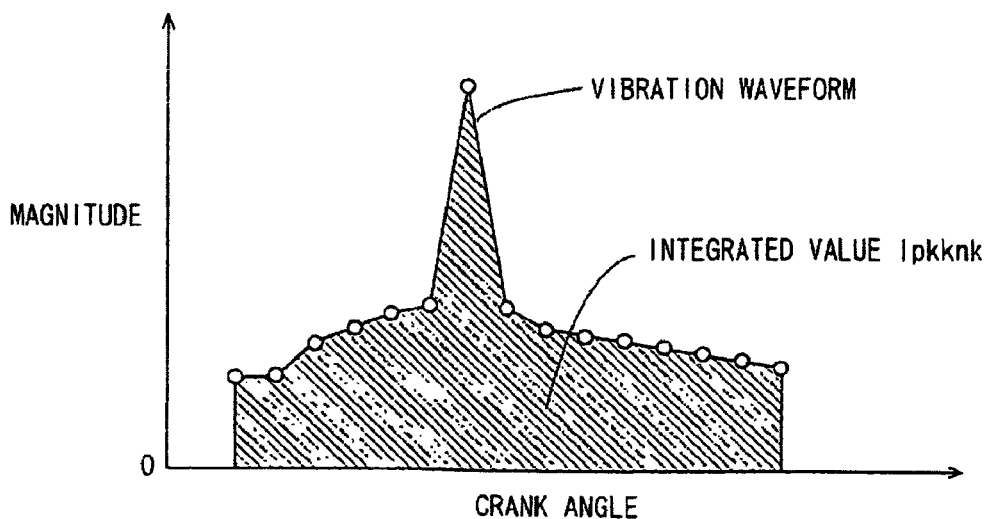
FIG. 9 shows an integrated value lpkknk.

In the present embodiment, knock magnitude N is calculated in addition to correlation coefficient K. As indicated by hatching in FIG. 9, knock magnitude N is calculated, using integrated value lpkknk obtained by summing the magnitudes (5°CA integrated values) in the knock detection gate. Instead of integrated value lpkknk, the maximum magnitude on the vibration waveform may be used.

A value representing the magnitude of vibration of engine 100 in the state where knocking does not occur in engine 100 is BGL (Back Ground Level). Knock magnitude N is calculated using the following equation (2).

$$N=lpkknk/BGL \quad (2)$$

The method of calculating knock magnitude N is not limited to the above-described one. BGL is calculated as a value obtained by subtracting a product of a standard deviation $\sigma$ and a positive coefficient (e.g., of 1) from a median value VM on a frequency distribution that represents a frequency (also may be represented as the number of times or probability) of detection of integrated value lpkknk. The method of calculating the BGL is not limited to the above, and the BGL may be stored in ROM 202. For producing the frequency distribution, the logarithmically transformed value of integrated value lpkknk is used.

Knock magnitude N is therefore represented as the difference between integrated value lpkknk and BGL on the frequency distribution of integrated value lpkkknk, as shown in FIG. 10.

In the present embodiment, the determination whether the knocking occurred or not is performed in response to every ignition, using correlation coefficient K calculated based on the shape of the vibration waveform and knock magnitude N calculated based on the magnitude of vibration waveform. Whether the knocking occurred or not is determined for each cylinder. When correlation coefficient K is equal to or larger than a threshold value K1, and knock magnitude N is equal to or larger than a determination value VJ, it is determined that the knocking occurred. Otherwise, it is determined that the knocking has not occurred.

When it is determined that the knocking has occurred, the ignition timing is retarded by a predetermined amount. When it is determined that the knocking has not occurred, the ignition timing is advanced by a predetermined amount.

As shown in FIG. 11, determination value VJ is defined for each of the regions divided according to engine speed NE and load KL. In the present embodiment, provided for each cylinder are nine regions divided by low speed (NE<NE1), intermediate speed (NE1≦NE≦NE2), high speed (NE2≦NE), low load (KL<KL1), intermediate load (KL1≦KL<KL2), and high load (KL2≦KL). Therefore, nine determination values VJ including VJ11-VJ 33 are defined according to engine speed NE and load KL.

In the present embodiment, engine speeds NE1 and NE2 used for the boundaries between the regions in which the knock detection gates are determined are used as the boundaries between the regions in which determination values VJ are determined. It can thus be said that determination value VJ is determined according to the knock detection gate. Engine speed NE that divides the regions in which the knock detection gates are determined may be different from engine speed NE that divides the regions in which determination values VJ are determined.

In the present embodiment, when a predetermined value in the state where the temperature of coolant of engine 100 is lower than a threshold value is defined as a lift amount, a predetermined determination value VJ is used. The method of setting determination value VJ is not limited to the above-noted ones. The regions in which determination values VJ are determined may be divided using a parameter other than engine speed NE and load KL.

At the time of shipment of engine 100 or the vehicle, ROM 202 has stored determination value VJ (an initial value of determination value VJ at the time of shipment) that is determined in advance by an experiment or the like. However, when variations in output value of knock sensor 300 or deterioration thereof may change the detected magnitude even when the same vibrations occur in engine 100. In this case, it is necessary to correct determination value VJ and to determine whether the knocking occurred or not, using determination value VJ corresponding to the actually detected magnitude. In the present embodiment, therefore, determination value VJ is corrected (learned) for every predetermined number IGN1 (for example, 200) of ignition cycles. Determination value VJ is corrected in each region.

Figure 12:
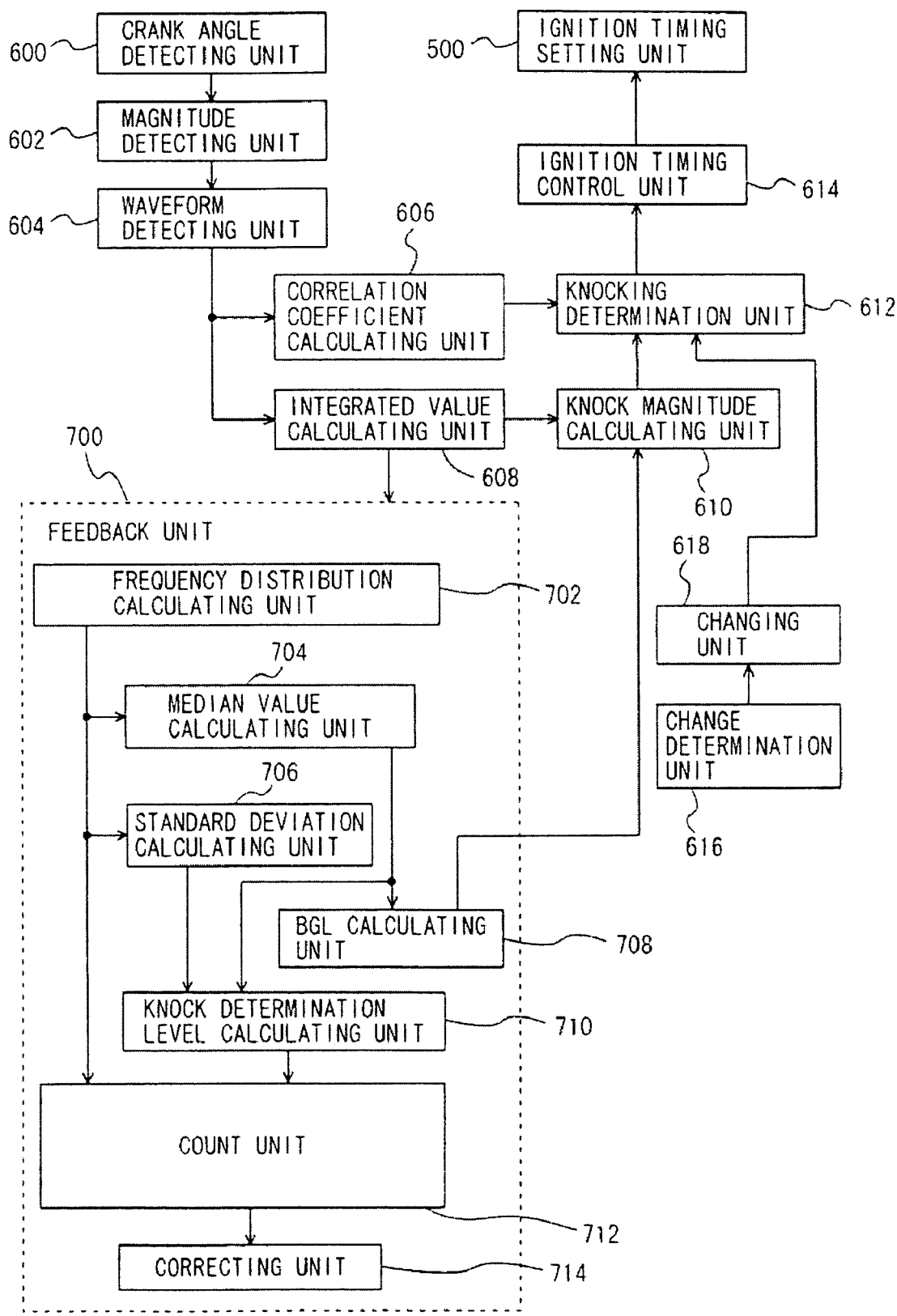
FIG. 12 is a functional block diagram of the engine ECU.

Referring to FIG. 12, a function of engine ECU 200 will be described below. The functions described below may be implemented by software or hardware.

Engine ECU 200 includes an ignition timing setting unit 500, a crank angle detecting unit 600, a magnitude detecting unit 602, a waveform detecting unit 604, a correlation coefficient calculating unit 606, an integrated value calculating unit 608, a knock magnitude calculating unit 610, a knocking determination unit 612, an ignition timing control unit 614, a change determination unit 616, a changing unit 618, and a feedback unit 700.

Ignition timing setting unit 500 sets basic ignition timing according to an operation state of engine 100. The basic ignition timing is set according to a map having engine speed NE and load KL as parameters.

Crank angle detecting unit 600 detects a crank angle based on a signal transmitted from crank position sensor 306.

Magnitude detecting unit 602 detects the magnitude of vibration at the knock detection gate based on the signal transmitted from knock sensor 300. The magnitude of vibration is detected corresponding to the crank angle. The magnitude of vibration is represented by the output voltage value of knock sensor 300. The magnitude of vibration may be represented by a value corresponding to the output voltage value of knock sensor 300.

Waveform detecting unit 604 detects the vibration waveform at the knock detection gate by integrating the magnitude of vibration for every crank angle of 5°CA.

Correlation coefficient calculating unit 606 calculates correlation coefficient K that represents the degree of similarity of the vibration waveform to the knock waveform model (i.e., represents the difference in form between the vibration waveform and the knock waveform model).

Integrated value calculating unit 608 calculates integrated value lpkknk obtained by integrating the magnitude (5°CA integrated value) on the vibration waveform corresponding to the knock detection gate.

Knock magnitude calculating unit 610 calculates knock magnitude N, using integrated value lpkknk. Knocking determination unit 612 determines in response to every ignition whether knocking occurred or not, using correlation coefficient K and knock magnitude N. When correlation coefficient K is equal to or larger than threshold value K1 and knock magnitude N is equal to or larger than determination value VJ, knocking determination unit 612 determines that the knocking occurred. Otherwise, it determines that the knocking has not occurred.

Ignition timing control unit 614 controls the correction of the ignition timing according to whether the knocking occurred or not. When it is determined that the knocking occurred, the ignition timing is retarded by a predetermined amount. When it is determined that the knocking has not occurred, the ignition timing is advanced by a predetermined amount.

Change determination unit 616 determines whether or not determination value VJ to be compared with knock magnitude N is to be changed. Whether determination value VJ is to be changed or not is determined based on the operation state of engine 100, i.e. engine speed NE, load KL, the lift amount of intake valve 116, etc.

Changing unit 618 changes determination value VJ at the timing corresponding to the relative magnitude between determination value VJ before change and determination value VJT after change when it is determined that determination value VJ to be compared with knock magnitude N is to be changed.

Figure 13:
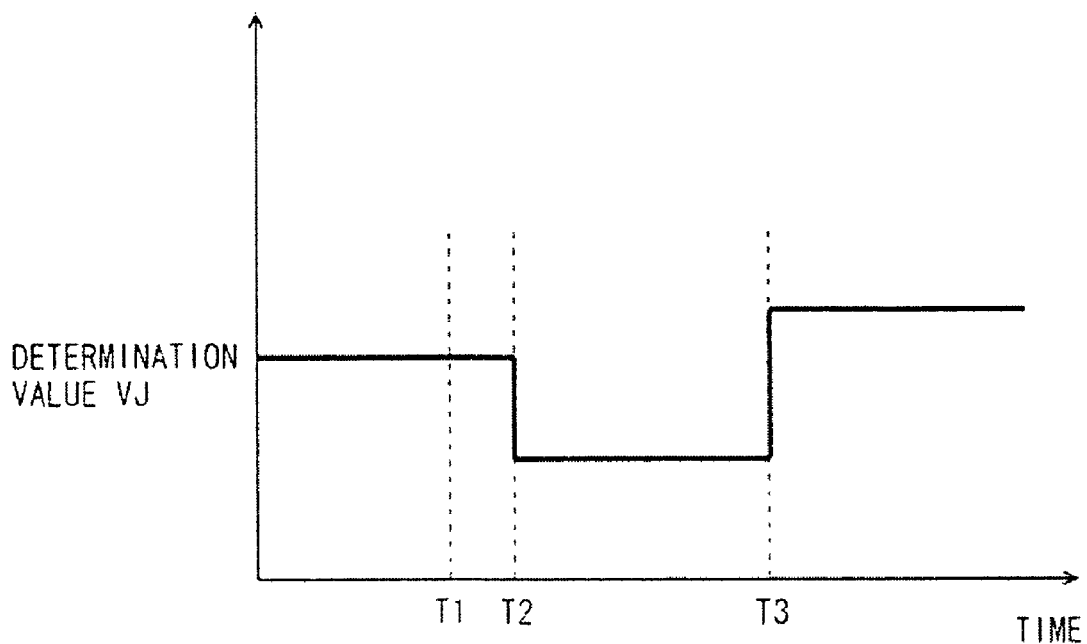
FIG. 13 is a timing chart showing the timing at which determination value VJ is changed.

When determination value VJ before change is larger than determination value VJ after change, as shown in FIG. 13, determination value VJ is changed at time T2 when a predetermined number IGN2 (e.g., 10) of ignition cycles (a predetermined time) have passed since it was determined that determination value VJ was to be changed at time T1. On the other hand, when determination value VJ before change is smaller than determination value VJ after change, determination value VJ is changed immediately after it is determined at time T3 that determination value VJ is to be changed. In other words, determination value VJ is changed before a predetermined number IGN2 of ignition cycles have passed. The timing at which determination value VJ is changed is not limited to the above-noted ones.

Feedback unit 700 sets determination value VJ to be compared with knock magnitude N. As shown in FIG. 12, feedback unit 700 includes a frequency distribution producing unit 702, a median value calculating unit 704, a standard deviation calculating unit 706, a BGL calculating unit 708, a knock determination level calculating unit 710, a count unit 712, and a correcting unit 714.

Figure 14:
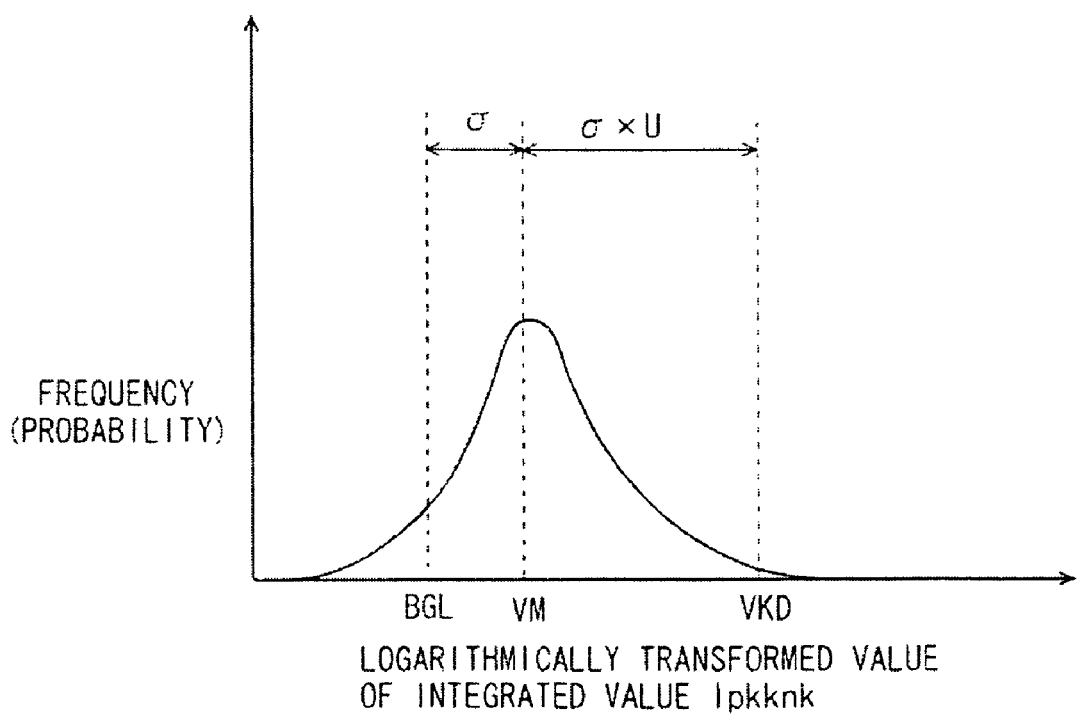
FIG. 14 is a (first) chart showing a frequency distribution of integrated value lpkknk.

Frequency distribution producing unit 702 produces the frequency distribution of integrated value lpkknk calculated in each ignition cycle, as shown in FIG. 14. For producing the frequency distribution, the logarithmically transformed value of integrated value lpkknk is used.

Median value calculating unit 704 calculates median value VM of integrated value lpkknk. Median value VM is calculated for every ignition cycle according to the following equation (3).

$$VM(i)=VM(i-1)+(lpkknk-V1(i-1))/X \quad (3)$$

In equation (3), VM(i) represents a current value. VM(i−1) represents a last value. X is a positive value. Thus, median value VM is calculated by updating it by an update amount "(lpkknk−VM(i−1))/X" that is determined according to integrated value lpkknk. As X decreases, the update amount of median value VM increases.

Median value VM calculated according to equation (3) is an approximate value representing the median value calculated based on multiple integrated values lpkknk (e.g., corresponding to 200 ignition cycles). Therefore, median value VM calculated according to equation (3) may be different from the actual median value.

When it is determined that determination value VJ to be compared with knock magnitude N is to be changed, median value calculating unit 704 increases the update amount of median value VM during a predetermined number IGN3 of ignition cycles (for example, IGN3=IGN2<IGN1). In other words, median value calculating unit 704 updates median value VM such that median value VM changes faster. In place of or in addition to increasing the update amount, the number of times or frequency of updating may be increased.

Standard deviation calculating unit 706 calculates a standard deviation σ of integrated value lpkknk. Standard deviation σ is calculated for every ignition cycle according to the following equation (4).

$$\sigma(i)=\sigma(i-1)+(lpkknk-\sigma(i-1))/Y \quad (4)$$

In equation (4), σ(i) represents a current value. σ((i−1) represents a last value. Y is a positive value. Thus, standard deviation σ is calculated by updating it by an update amount "(lpkknk−σ((i−1))/Y" that is determined according to integrated value lpkknk.

Standard deviation σ calculated according to equation (4) is an approximate value representing the standard deviation that is calculated based on a plurality of integrated values lpkknk (e.g., for 200 ignition cycles). Therefore, the standard deviation σ calculated according to equation (4) may be different from the actual standard deviation.

Standard deviation calculating unit 706 also stops the updating of standard deviation σ during a predetermined number IGN3 of ignition cycles when it is determined that determination value VJ to be compared with knock magnitude N is to be changed.

Instead of calculating median value VM and standard deviation σ according to equations (3) and (4), the following calculation method may be used.

When integrated value lpkknk that is currently calculated is larger than last calculated median value VM, the value obtained by adding a predetermined value C1 to last calculated median value VM is handled as currently calculated median value VM. Conversely, when currently calculated integrated value lpkknk is smaller than last calculated median value VM, a value obtained by subtracting a predetermined value C2 (e.g., equal to C1) from last calculated median value VM is handled as currently calculated median value VM.

When currently calculated integrated value lpkknk is smaller than last calculated median value VM and is larger than a value obtained by subtracting last calculated standard deviation σ from last calculated median value VM, the value obtained by subtracting double a predetermined value C3 from last calculated standard deviation σ is handled as currently calculated standard deviation σ. Conversely, when currently calculated integrated value lpkknk is larger than last calculated median value VM, or is smaller than the value obtained by subtracting last calculated standard deviation σ from last calculated median value VM, a value obtained by adding predetermined value C4 (e.g., equal to C3) to last calculated standard deviation σ is handled as currently calculated standard deviation σ. The initial values of median value VM and standard deviation σ may take predetermined values, respectively, and may also be equal to zero.

BGL calculating unit 708 calculates the BGL by subtracting standard deviation σ from median value VM as shown in FIG. 14.

Knock determination level calculating unit 710 calculates (i.e., sets) a knock determination level VKD, using median value VM and standard deviation σ. As shown in FIG. 14, a value obtained by adding a product of a positive coefficient U (that is a constant, e.g., equal to 3) and standard deviation σ to median value VM is handled as knock determination level VKD. The method of calculating knock determination level VKD is not restricted to this.

Coefficient U is obtained from data or knowledge derived by an experiment or the like. Integrated value lpkknk larger than knock determination level VKD attained in the case of (U=3) is substantially equal to integrated value lpkknk in the ignition cycle in which the knocking actually occurred. Coefficient U may take a value other than three.

Count unit 712 counts a frequency of integrated value lpkknk equal to or larger than knock determination level VKD in a predetermined number IGN1 of ignition cycles (e.g., 200 ignition cycles), and thereby obtains a knock count KC. Count unit 712 may count a rate of integrated value lpkknk equal to or higher than knock determination level VKD.

Correcting unit 714 corrects determination value VJ to reduce it by a predetermined correction amount A1 when knock count KC is equal to or larger than a threshold value KC1. Also, correcting unit 714 corrects determination value VJ to increase it by a predetermined correction amount A when knock count KC is smaller than threshold value KC1.

Figure 15:
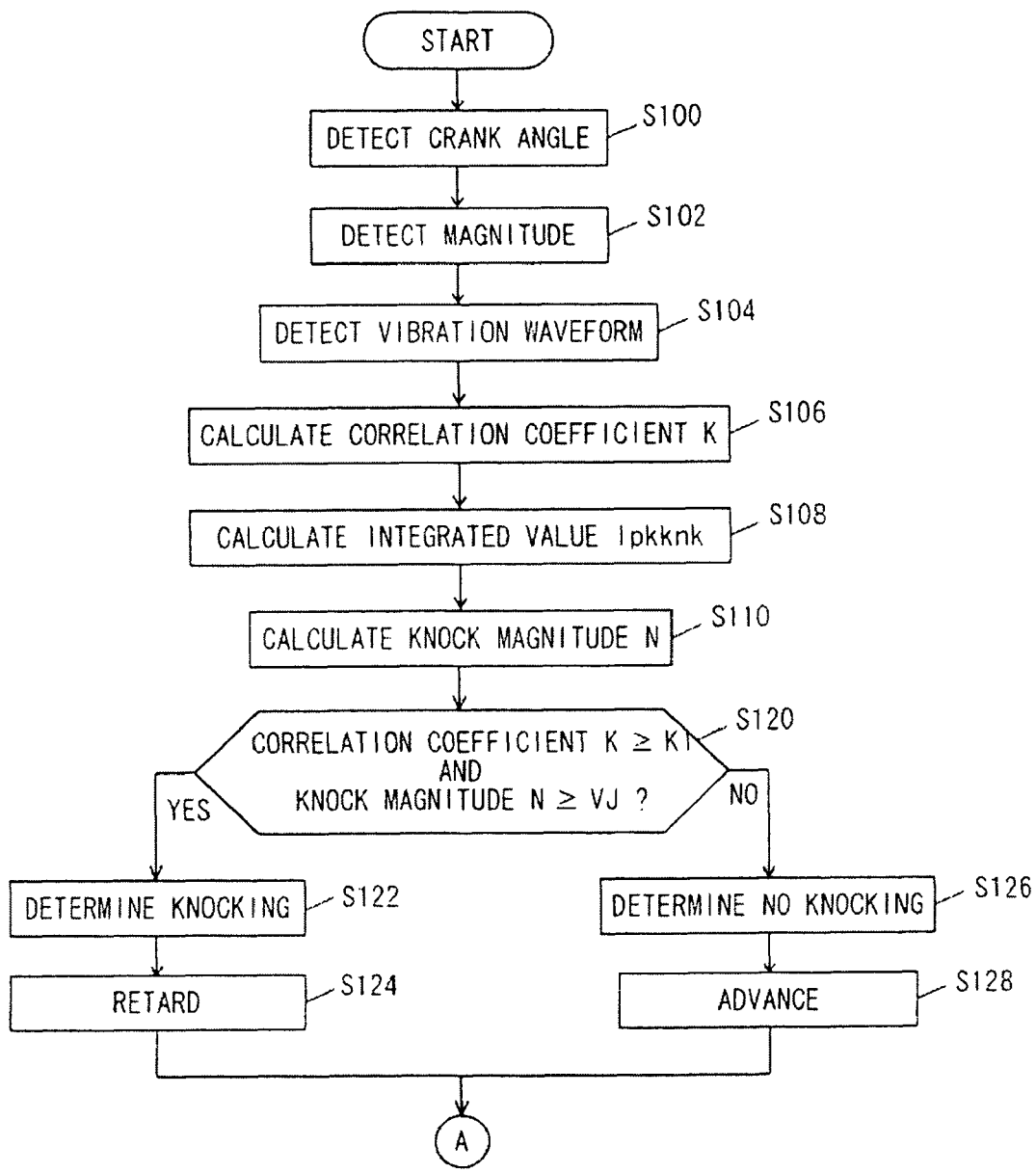
FIG. 15 is a (first) diagram showing a control structure of a program executed by the engine ECU.
Figure 16:
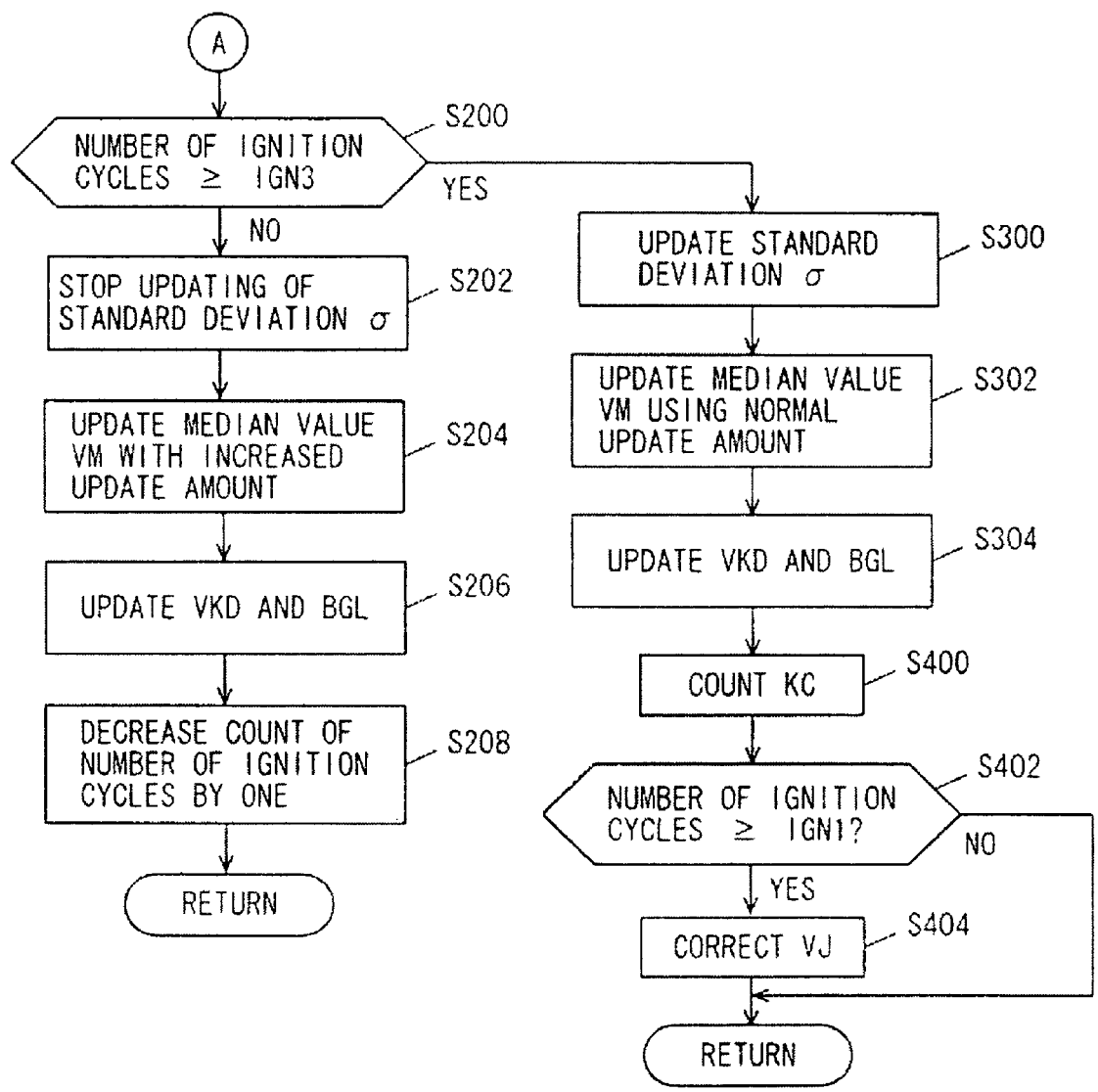
FIG. 16 is a (second) diagram showing the control structure of the program executed by the engine ECU.
Figure 17:
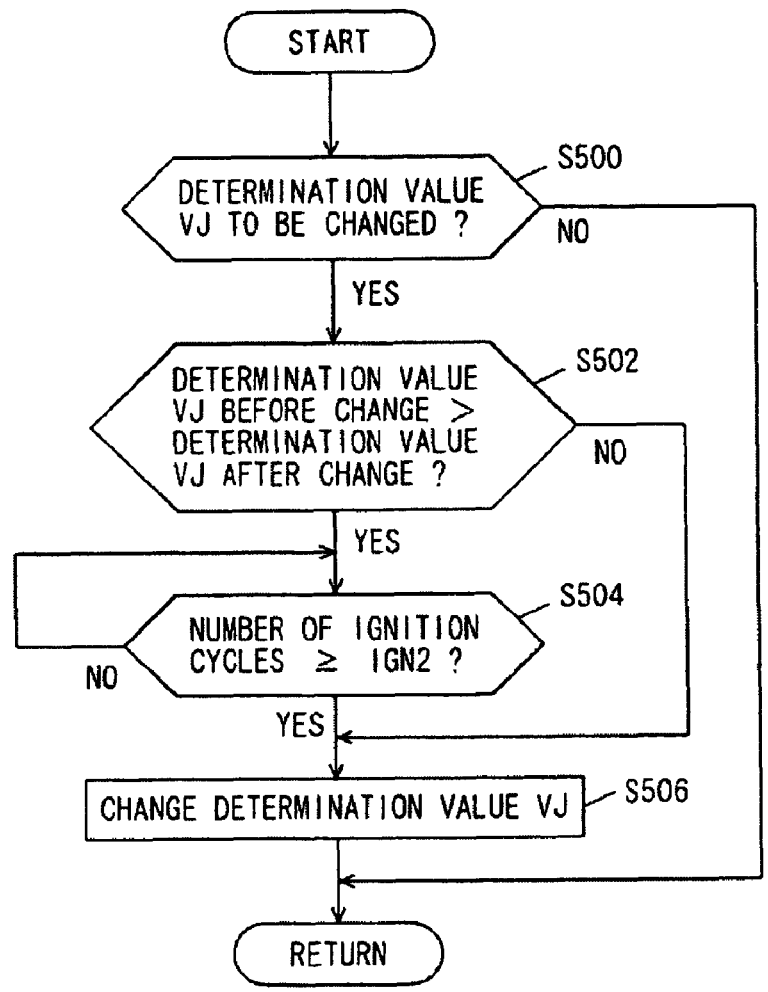
FIG. 17 is a (third) diagram showing the control structure of the program executed by the engine ECU.

Referring to FIGS. 15-17, the control structure of the program executed by engine ECU 200 will be described below.

In step (hereinafter "step" will be abbreviated as "S") 100, engine ECU 200 detects the crank angle based on a signal sent from crank position sensor 306. In S102, engine ECU 200 detects the magnitude of vibration of engine 100 corresponding to the crank angle based on the signal sent from knock sensor 300.

In S104, engine ECU 200 obtains the 5°CA integrated value by integrating the output voltage value (representing the magnitude of vibration) of knock sensor 300 for every crank angle of 5°CA (in the range of 5°CA), and thereby detects the vibration waveform of engine 100.

In S106, engine ECU 200 calculates correlation coefficient K. In S108, engine ECU 200 calculates integrated value lpkknk. In S110, engine ECU 200 calculates knock magnitude N.

In S120, engine ECU 200 determines whether such a condition is satisfied or not that correlation coefficient K is equal to or larger than threshold value K1 and knock magnitude N is equal to or larger than determination value VJ. When correlation coefficient K is equal to or larger than threshold value K1 and knock magnitude N is equal to or larger than determination value VJ (YES in S120), the process proceeds to S122. Otherwise (NO in S120), the process proceeds to S126.

In S122, engine ECU 200 determines that engine 100 knocked. In S124, engine ECU 200 retards the ignition timing. In S126, engine ECU 200 determines that engine 100 has not knocked. In S128, engine ECU 200 advances the ignition timing.

Referring to FIG. 16, engine ECU 200 determines in S200 whether or not the number of ignition cycles after the determination that determination value VJ to be compared with knock magnitude N is to be changed is equal to or larger than the predetermined number IGN3.

When the number of ignition cycles after the determination that determination value VJ is to be changed is equal to or larger than the predetermined number IGN3 (YES in S200), the process proceeds to S300. Otherwise (NO in S200), the process proceeds to S202.

In S202, engine ECU 200 stops the updating of standard deviation σ. In S204, engine ECU 200 updates median value VM by increasing the update amount of median value VM. In S206, engine ECU 200 updates (sets) knock determination level VKD and the BGL.

In S208, engine ECU 200 reduces the count of the number of ignition cycles after correction of determination value VJ, by one. In other words, the update amount of median value VM is increased, and in addition, the count of the number of ignition cycles after correction of determination value VJ is stopped while the updating of standard deviation σ is stopped. Then, the process returns to S100.

In S300, engine ECU 200 updates standard deviation σ. In S302, engine ECU 200 updates median value VM using a normal update amount. More specifically, median value VM is updated using an update amount smaller than the update amount used while the number of ignition cycles after the determination that determination value VJ is to be changed is smaller than predetermined number IGN3. In S304, engine ECU 200 updates knock determination level VKD and the BGL.

In S400, engine ECU 200 counts knock count value KC. In S402, engine ECU 200 determines whether or not the number of ignition cycles after the last correction of determination value VJ is equal to or larger than predetermined number IGN1. When the number of ignition cycles after the last correction of determination value VJ is equal to or larger than predetermined number IGN1 (YES in S402), the process proceeds to S404. Otherwise (NO in S402), the process returns to S100.

In S404, engine ECU 200 corrects determination value VJ according to knock count value KC. When knock count value KC is equal to or larger than threshold value KC1, determination value VJ is corrected and decreased by a predetermined correction amount A1. When knock count value KC is smaller than threshold value KC1, determination value VJ is corrected and increased by predetermined correction amount A2.

The order of processing in S100-S404 is not restricted to that shown in FIGS. 15 and 16. The processing in S100-S404 may be executed in the order different from that shown in FIGS. 15 and 16.

Referring to FIG. 17, in S500, engine ECU 200 determines whether or not determination value VJ to be compared with knock magnitude N is to be changed. When it is determined that determination value VJ is to be changed (YES in S500), the process proceeds to S502. Otherwise (NO in S500), the process returns to S500.

In S502, engine ECU 200 determines whether or not determination value VJ before change is larger than determination value VJ after change. When determination value VJ before change is larger than determination value VJ after change (YES in S502), the process proceeds to S504. Otherwise (NO in S502), the process proceeds to S506.

In S504, engine ECU 200 determines whether the number of ignition cycles after the determination that determination value VJ is to be changed is equal to or larger than predetermined number IGN2 or not. When the number of ignition cycles after the determination that determination value VJ is to be changed is equal to or larger than predetermined number IGN2 (YES in S504), the process proceeds to S506. Otherwise (NO in S504), the process returns to S504.

In S506, engine ECU 200 changes determination value VJ to be compared with knock magnitude N.

Based on the structure and flowcharts described above, engine ECU 200 of the present embodiment operates as described below.

During the operation of engine 100, the crank angle is detected based on a signal sent from crank position sensor 306 (S100). Based on the signal sent from knock sensor 300, the magnitude of vibration of engine 100 is detected corresponding to the crank angle (S102). The 5°CA integrated value is calculated by integrating the output voltage value of knock sensor 300 for every crank angle of 5°CA, and thereby the vibration waveform of engine 100 is detected (S104).

For determining whether the knocking occurred or not, based on the shape of the waveform, correlation coefficient K is calculated using the knock waveform model (S106). Further, integrated value lpkknk is calculated (S108) for determining whether the vibration waveform contains the vibration caused by the knocking or not. Integrated value lpkknk is divided by the BGL to calculate knock magnitude N (S 100).

When correlation coefficient K is equal to or larger than threshold value K1 and knock magnitude N is equal to or larger than determination value VJ (YES in S120), it can be considered that the shape of the detected waveform is similar to that of the waveform of the knocking and the magnitude of vibration is large. Thus, it can be considered that the probability of occurrence of the knocking is very high. In this case, it is determined that engine 100 knocked (S122). For suppressing the knocking, the ignition timing is retarded (S124).

Conversely, when correlation coefficient K is smaller than threshold value K1, or when knock magnitude N is smaller than determination value VJ, it is determined that engine 100 has not knocked (S126). In this case, the ignition timing is advanced (S128).

When the number of ignition cycles after the determination that determination value VJ to be compared with knock magnitude N is to be changed is equal to or larger than predetermined number IGN3 (YES in S200), standard deviation σ is updated (S300). Further, median value VM is updated using the normal update amount (S302). Knock determination level VKD and the BGL are updated using the updated median value VM and standard deviation σ (S304).

For correcting determination value VJ, knock count value KC is counted using knock determination level VKD (S400). When the number of ignition cycles after the last correction of determination value VJ is equal to or larger than predetermined number IGN1 (YES in S402), determination value VJ is corrected according to knock count value KC (S404).

When knock count KC is equal to or larger than threshold value KC1, determination value VJ is corrected and decreased by correction amount A1. This increases the possibility of the determination that the knocking occurred. Therefore, it is possible to increase the frequency of retarding the ignition timing. Consequently, it is possible to reduce the number of times the knocking occurs.

When knock count KC is smaller than threshold value KC1, determination value VJ is corrected and increased by correction amount A2. This reduces the possibility of the determination that the knocking occurred. Therefore, it is possible to increase the frequency of advancing the ignition timing. Consequently, it is possible to increase the output of engine 100.

Figure 18:
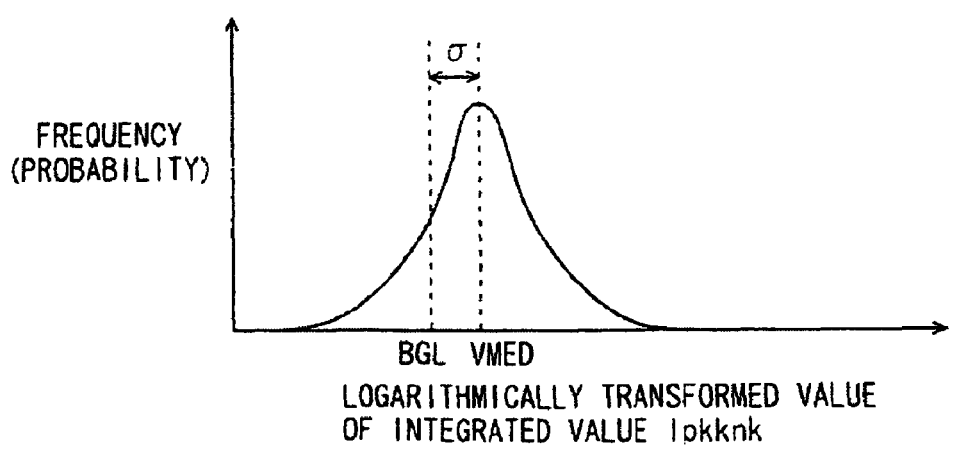
FIG. 18 is a (second) chart showing the frequency distribution of integrated value lpkknk.

In the operation state where the knocking has not substantially occurred and the operation state is stable, the frequency of integrated value lpkknk exhibits a normal distribution as shown in FIG. 18. Standard deviation σ is small in this frequency distribution.

However, when the operation state of engine 100 changes, i.e. engine speed NE, load KL, the lift amount of intake valve 116, etc. change, the magnitude of mechanical vibration of engine 100 itself changes, irrespective of knocking. Thus, the frequency distribution of integrated value lpkknk may change significantly. Therefore, standard deviation σ may increase. The increase in standard deviation σ decreases the BGL. This may suddenly increases knock magnitude N that is calculated by dividing integrated value lpkknk by the BGL.

In the present embodiment, for accurately determining whether knocking occurred or not, a plurality of determination values VJ are set according to the operation state of engine 100. Thus, determination value VJ may be changed to be reduced in the state where the operation state of engine 100 changes and knock magnitude N may suddenly increase. Thus, when determination value VJ is to changed, knock magnitude N tends to be larger than determination value VJ, although knocking does not occur. In other words, the ignition timing tends to be erroneously retarded.

Arithmetic processing in engine ECU 200 requires a time. Therefore, after the mechanical vibration of engine 100 itself changes, median value VM etc. may be updated later than the actually detected integrated value lpkknk.

Then, in the present embodiment, when the operation state of engine 100 changes, i.e. when determination value VJ is changed, the updating of standard deviation σ is stopped and the update amount of median value VM is increased.

When the number of ignition cycles after the determination that determination value VJ to be compared with knock magnitude N is to be changed is smaller than predetermined number IGN3 (NO in S200), the updating of standard deviation σ is stopped (S202) and median value VM is updated with the increased update amount (S204). Knock determination level VKD and the BGL are updated using the updated median value VM and the not-updated standard deviation σ (S206).

Accordingly, in the case where the operation state of engine 100 changes, for example, when determination value VJ is changed, a sudden increase of standard deviation σ is prevented, and in addition, median value VM can be updated quickly according to the actually detected integrated value Ipkknk. This can prevent a sudden increase of BGL that is calculated by subtracting standard deviation σ from median value VM. In addition, it is possible to obtain the BGL that fits the actually detected integrated value Ipkknk. This can reduce fluctuations of knock magnitude N caused by factors other than knocking when knock magnitude N is calculated by dividing integrated value Ipkknk by the BGL. As a result, whether knocking has occurred or not can be determined precisely and the ignition timing can be controlled precisely.

After median value VM is updated with a large update amount, the count of number of ignition cycles after the correction of determination value VJ is reduced by one (S208). Thus, the count of number of ignition cycles after the correction of determination value VJ is reduced by the number of times median value VM is updated with the large update amount.

When it is determined that determination value VJ to be compared with knock magnitude N is to be changed (YES in S500), and when determination value VJ before change is larger than determination value VJ after change (YES in S502), after the number of ignition cycles after the determination that determination value VJ is to be changed becomes equal to or larger than predetermined number IGN2 (YES in S504), determination value VJ is changed (S506). When determination value VJ before change is smaller than determination value VJ after change (NO in S502), determination value VJ is changed quickly (S506).

Thus, in the state where the BGL's delay in following the actually detected integrated value Ipkknk may cause knock magnitude N to suddenly increase, the state of a large determination value VJ can be maintained. Thus, the frequency of erroneously retarding the ignition timing can be reduced.

As described above, the ignition timing control apparatus according to the embodiment calculates knock magnitude N by dividing the integrated value Ipkknk by the BGL. The ignition timing is controlled according to whether knock magnitude N is equal to or larger than determination value VJ or not. The BGL is determined by subtracting standard deviation σ from median value VM of integrated value Ipkknk. When it is determined that determination value VJ to be compared with knock magnitude N is to be changed, the updating of standard deviation σ is stopped and median value VM is updated with the increased updated amount. This can prevent a sudden increase of standard deviation σ, and median value VM can be updated quickly according to the actually detected integrated value Ipkknk. This can prevent a sudden increase of the BGL that is calculated by subtracting standard deviation σ from median value VM, and it is possible to obtain the BGM that fits the actually detected integrated value Ipkknk. Therefore, it is possible to reduce fluctuations, which are caused by factors other than knocking, of knock magnitude N calculated by dividing integrated value Ipkknk by the BGL. Consequently, it is possible to precisely determine whether knocking has occurred or not and to control the ignition timing precisely.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An ignition timing control apparatus for an internal combustion engine comprising:
   a knock sensor detecting a magnitude of vibration of the internal combustion engine in a plurality of ignition cycles; and
   a control unit, wherein
   said control unit calculates a first value representing a median value of said magnitude by updating the first value according to said magnitude,
   calculates a second value representing a standard deviation of said magnitude by updating the second value according to said magnitude,
   calculates a third value based on said first and second values,
   calculates a fourth value based on said magnitude and said third value,
   controls ignition timing of said internal combustion engine according to a result of comparison between said fourth value and a determination value selected from among a predetermined plurality of determination values,
   determines whether the determination value to be compared with said fourth value is to be changed or not, and
   updates said first value so that said first value changes faster, when it is determined that the determination value to be compared with said fourth value is to be changed.

2. An ignition timing control method for an internal combustion engine, comprising the steps of:
   detecting a magnitude of vibration of the internal combustion engine in a plurality of ignition cycles;
   calculating a first value representing a median value of said magnitude by updating the first value according to said magnitude;
   calculating a second value representing a standard deviation of said magnitude by updating the second value according to said magnitude;
   calculating a third value based on said first and second values;
   calculating a fourth value based on said magnitude and said third value;
   controlling ignition timing of said internal combustion engine according to a result of comparison between said fourth value and a determination value selected from among a predetermined plurality of determination values; and
   determining whether the determination value to be compared with said fourth value is to be changed or not,
   said step of calculating the first value including the step of updating said first value so that said first value changes faster, when it is determined that the determination value to be compared with said fourth value is to be changed.

3. An ignition timing control apparatus for an internal combustion engine comprising:
   means for detecting a magnitude of vibration of the internal combustion engine in a plurality of ignition cycles;
   first calculating means for calculating a first value representing a median value of said magnitude by updating the first value according to said magnitude;
   second calculating means for calculating a second value representing a standard deviation of said magnitude by updating the second value according to said magnitude;
   third calculating means for calculating a third value based on said first and second values;

fourth calculating means for calculating a fourth value based on said magnitude and said third value;

control means for controlling ignition timing of said internal combustion engine according to a result of comparison between said fourth value and a determination value selected from among a predetermined plurality of determination values; and means for determining whether the determination value to be compared with said fourth value is to be changed or not, said first calculating means including updating means for updating said first value so that said first value changes faster, when it is determined that the determination value to be compared with said fourth value is to be changed.

4. An ignition timing control apparatus for an internal combustion engine comprising:

a knock sensor detecting a magnitude of vibration of the internal combustion engine in a plurality of ignition cycles; and a control unit, wherein said control unit calculates a first value representing a median value of said magnitude by updating the first value according to said magnitude, calculates a second value representing a standard deviation of said magnitude by updating the second value according to said magnitude, calculates a third value based on said first and second values, calculates a fourth value based on said magnitude and said third value, controls ignition timing of said internal combustion engine according to a result of comparison between said fourth value and a determination value selected from among a predetermined plurality of determination values, determines whether the determination value to be compared with said fourth value is to be changed or not, updates said first value so that said first value changes faster, when it is determined that the determination value to be compared with said fourth value is to be changed, and stops updating of said second value when it is determined that the determination value to be compared with said fourth value is to be changed.

5. The ignition timing control apparatus for the internal combustion engine according to claim 4, wherein said control unit updates said first value so that said first value changes faster by a predetermined number of times, when it is determined that the determination value to be compared with said fourth value is to be changed, and stops updating of said second value by said predetermined number of times, when it is determined that the determination value to be compared with said fourth value is to be changed.

6. The ignition timing control apparatus for the internal combustion engine according to claim 4, wherein said internal combustion engine is provided with a mechanism changing a lift amount of at least one of an intake valve and an exhaust valve, and a plurality of said determination values are determined according to the lift amount of at least one of said intake valve and said exhaust valve.

7. The ignition timing control apparatus for the internal combustion engine according to claim 4, wherein a plurality of said determination values are determined according to a load and a number of revolutions of an output shaft of said internal combustion engine.

8. The ignition timing control apparatus for the internal combustion engine according to claim 4, wherein said knock sensor detects the magnitude of vibration of said internal combustion engine in a predetermined crank angle section, a plurality of lengths of said crank angle section are determined according to a number of revolutions of an output shaft of said internal combustion engine, and a plurality of said determination values are determined according to the length of said crank angle section.

9. The ignition timing control apparatus for the internal combustion engine according to claim 4, wherein said knock sensor detects the magnitude of vibration of said internal combustion engine in a predetermined crank angle section, a plurality of said crank angle sections are determined according to a number of revolutions of an output shaft of said internal combustion engine, and a plurality of said determination values are determined according to said crank angle section.

10. The ignition timing control apparatus for the internal combustion engine according to claim 4, wherein when it is determined that the determination value to be compared with said fourth value is to be changed, said control unit changes the determination value to be compared with said fourth value at timing corresponding to a relative magnitude between the determination value before change and the determination value after change.

11. The ignition timing control apparatus for the internal combustion engine according to claim 10, wherein said control unit retards the ignition timing when said fourth value is larger than said determination value, changes the determination value to be compared with said fourth value after a predetermined time has passed since it was determined that the determination value to be compared with said fourth value was to be changed, when the determination value before change is larger than the determination value after change, and changes the determination value to be compared with said fourth value before said predetermined time has passed since it was determined that the determination value to be compared with said fourth value was to be changed, when the determination value before change is smaller than the determination value after change.

12. An ignition timing control method for an internal combustion engine comprising the steps of:

detecting a magnitude of vibration of the internal combustion engine in a plurality of ignition cycles;

calculating a first value representing a median value of said magnitude by updating the first value according to said magnitude;

calculating a second value representing a standard deviation of said magnitude by updating the second value according to said magnitude;

calculating a third value based on said first and second values;

calculating a fourth value based on said magnitude and said third value;

controlling ignition timing of said internal combustion engine according to a result of comparison between said fourth value and a determination value selected from among a predetermined plurality of determination values; and determining whether the determination value to be compared with said fourth value is to be changed or not, said step of calculating the first value including the step of updating said first value so that said first value changes faster, when it is determined that the determination value to be compared with said fourth value is to be changed, said step of calculating the second value including the step of stopping updating of said second value, when it is determined that the determination value to be compared with said fourth value is to be changed.

13. The ignition timing control method for the internal combustion engine according to claim 12, wherein said step of updating the first value has the step of updating said first value so that said first value changes faster by a predetermined number of times, and said step of stopping updating of the second value has the step of stopping updating of said second value by said predetermined number of times.

14. The ignition timing control method for the internal combustion engine according to claim 12, wherein said internal combustion engine is provided with a mechanism changing a lift amount of at least one of an intake valve and an exhaust valve, and a plurality of said determination values are determined according to the lift amount of at least one of said intake valve and said exhaust valve.

15. The ignition timing control method for the internal combustion engine according to claim 12, wherein a plurality of said determination values are determined according to a load and a number of revolutions of an output shaft of said internal combustion engine.

16. The ignition timing control method for the internal combustion engine according to claim 12, wherein said step of detecting the magnitude of vibration of said internal combustion engine includes the step of detecting the magnitude of vibration of said internal combustion engine in a predetermined crank angle section, a plurality of lengths of said crank angle section are determined according to a number of revolutions of an output shaft of said internal combustion engine, and a plurality of said determination values are determined according to the length of said crank angle section.

17. The ignition timing control method for the internal combustion engine according to claim 12, wherein said step of detecting a magnitude of vibration of said internal combustion engine includes the step of detecting the magnitude of vibration of said internal combustion engine in a predetermined crank angle section, a plurality of said crank angle sections are determined according to a number of revolutions of an output shaft of said internal combustion engine, and a plurality of said determination values are determined according to said crank angle section.

18. The ignition timing control method for the internal combustion engine according to claim 12, further comprising the step of changing the determination value to be compared with said fourth value at timing corresponding to a relative magnitude between the determination value before change and the determination value after change, when it is determined that the determination value to be compared with said fourth value is to be changed.

19. The ignition timing control method for the internal combustion engine according to claim 18, wherein said step of controlling ignition timing of said internal combustion engine includes the step of retarding the ignition timing, when said fourth value is larger than said determination value, and said step of changing the determination value includes the steps of changing the determination value to be compared with said fourth value after a predetermined time has passed since it was determined that the determination value to be compared with said fourth value was to be changed, when the determination value before change is larger than the determination value after change, and changing the determination value to be compared with said fourth value before said predetermined time has passed since it was determined that the determination value to be compared with said fourth value was to be changed, when the determination value before change is smaller than the determination value after change.

20. An ignition timing control apparatus for an internal combustion engine comprising:

means for detecting a magnitude of vibration of the internal combustion engine in a plurality of ignition cycles;

first calculating means for calculating a first value representing a median value of said magnitude by updating the first value according to said magnitude;

second calculating means for calculating a second value representing a standard deviation of said magnitude by updating the second value according to said magnitude;

third calculating means for calculating a third value based on said first and second values;

fourth calculating means for calculating a fourth value based on said magnitude and said third value;

control means for controlling ignition timing of said internal combustion engine according to a result of comparison between said fourth value and a determination value selected from among a predetermined plurality of determination values; and means for determining whether the determination value to be compared with said fourth value is to be changed or not, said first calculating means including updating means for updating said first value so that said first value changes faster, when it is determined that the determination value to be compared with said fourth value is to be changed, said second calculating means including stopping means for stopping updating of said second value when it is determined that the determination value to be compared with said fourth value is to be changed.

21. The ignition timing control apparatus for the internal combustion engine according to claim 20, wherein said updating means has means for updating said first value so that said first value changes faster by a predetermined number of times, and said stopping means has means for stopping updating of said second value by said predetermined number of times.

22. The ignition timing control apparatus for the internal combustion engine according to claim 20, wherein said internal combustion engine is provided with a mechanism changing a lift amount of at least one of an intake valve and an exhaust valve, and a plurality of said determination values are determined according to the lift amount of at least one of said intake valve and said exhaust valve.

23. The ignition timing control apparatus for the internal combustion engine according to claim 20, wherein a plurality of said determination values are determined according to a load and a number of revolutions of an output shaft of said internal combustion engine.

24. The ignition timing control apparatus for the internal combustion engine according to claim 20, wherein said detection means has means for detecting the magnitude of vibration of said internal combustion engine in a predetermined crank angle section, a plurality of lengths of said crank angle section are determined according to a number of revolutions of an output shaft of said internal combustion engine, and a plurality of said determination values are determined according to the length of said crank angle section.

25. The ignition timing control apparatus for the internal combustion engine according to claim 20, wherein said detection means includes means for detecting the magnitude of vibration of said internal combustion engine in a predetermined crank angle section, a plurality of said crank angle sections are determined according to a number of revolutions of an output shaft of said internal combustion engine, and a plurality of said determination values are determined according to said crank angle section.

26. The ignition timing control apparatus for the internal combustion engine according to claim 20, further comprising changing means for changing the determination value to be compared with said fourth value at timing corresponding to a relative magnitude between the determination value before change and the determination value after change, when it is determined that the determination value to be compared with said fourth value is to be changed.

27. The ignition timing control apparatus for the internal combustion engine according to claim 26, wherein said control means include means for retarding the ignition timing when said fourth value is larger than said determination value, and said change means includes means for changing the determination value to be compared with said fourth value after a predetermined time has passed since it was determined that the determination value to be compared with said fourth value was to be changed, when the determination value before change is larger than the determination value after change, and means for changing the determination value to be compared with said fourth value before said predetermined time has passed since it was determined that the determination value to be compared with said fourth value was to be changed, when the determination value before change is smaller than the determination value after change.

* * * * *